June 15, 1926.
A. FRISCH
1,588,544
DEVICE FOR CONVERTING PRESSURE EFFECTS INTO
EQUIVALENT ELECTRICAL EFFECTS
Filed June 23, 1923
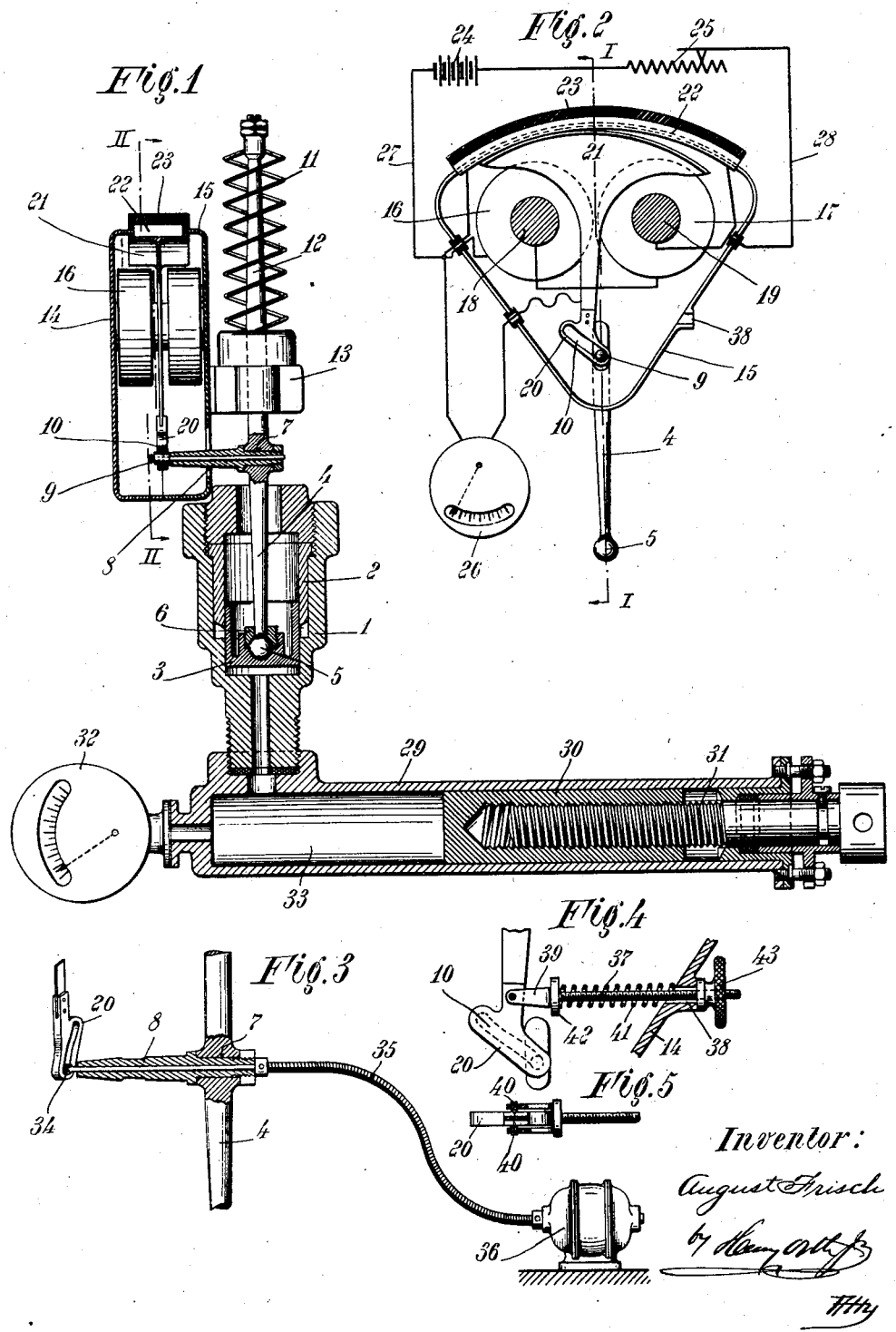
Inventor:
August Frisch
by Harry Orth
Atty Patented June 15, 1926.

1,588,544

UNITED STATES PATENT OFFICE.

AUGUST FRISCH, OF MUNICH-SOLLN, GERMANY.

DEVICE FOR CONVERTING PRESSURE EFFECTS INTO EQUIVALENT ELECTRICAL EFFECTS.

Application filed June 23, 1923, Serial No. 647,297, and in Germany June 29, 1922.

The known devices for converting pressure effects into electrical effects for the purpose of enabling a transmission of the former over a distance, which conversion is for instance utilized in arrangements for measuring the power of reciprocating engines according to my Letters Patent No. 1,355,661 patented Oct. 12, 1920, and similar apparatus are generally lacking in accuracy of transmission or cause great difficulties in their calibration, as the transmission means at the disposal such as springs, resistances and the like do not show any determined proportionality.

The object of the present invention is the compensation of such faults inherent to the transmission means and is obtained by inserting into the train of transmission means at the point in which their directions of movement are inclined towards each other a curve acting as transmission means, the shape of the curve being determined by means of a setting out or milling device which takes up the place of the roller adapted to cooperate with said curve, the individual effects being induced simultaneously and proportionately.

The subject matter of the present invention is illustrated by way of example on the accompanying drawings in which Fig. 1 is a diagrammatic section on line I—I Fig. 2 through the device in connection with the means for adjusting the pressure serving to determine the curve; and Fig. 2 is a diagrammatic sectional elevation on line II—II Fig. 1 of the electric part of the device and the apparatus serving to control the electric effects such as a source of current, a regulating resistance and a measuring instrument.

Fig. 3 shows on an enlarged scale a milling apparatus for determining the curve in operative position and Figs. 4 and 5 illustrate on an enlarged scale in elevation and plan view respectively an auxiliary device for causing a displacement of the electrical part.

Referring now to Figs. 1 and 2, 1 denotes the casing of the indicator which is provided with a cylinder lining 2 and a plunger 3. The latter is fixed to the plunger rod 4 by means of a spherical joint 5, 6 and is provided with a bore 7 in which a hollow arm 8 is fixed with its one end, the other end carrying a roller 9 adapted to cooperate with a curve or slot 10. 11 denotes the indicator spring inserted between the end of the elongation 12 of the piston rod and a bracket 13. 14 and 15 are the two halves of an iron casing to which the coils 16 and 17 respectively having iron cores 18 and 19 are fixed. The slot or curve 10 is contained in a frame 20 which is rigidly fixed to the contact segment 21 cooperating with the resistance 22 embedded in an insulating mass 23. 24 denotes the source of current, 25 a regulating resistance, 26 a current meter, and 27 and 28 the electric connections to the contact segment 21. The casing 1 of the indicator is connected by screw joint to the cylinder 29 of a device for generating a fluid pressure. Inside the cylinder 29 a piston 30 can be displaced by means of a screw 31 whereby the pressure of the fluid can be adjusted, 32 is a manometer in communication with the interior 33 of the cylinder 29 for indicating the generated fluid pressure.

Fig. 3 illustrates the cutter 34 inserted in the arm 8 to replace the roller 9 shown in Fig. 1. The cutter is rotated by means of a flexible shaft 35 by an electric motor 36, and Figs. 4 and 5 show the auxiliary device consisting of a rod 37 provided with screw thread and extending through an aperture 38 of the wall of the casing 14, 15. To the one end of the rod 37 a fork 39 is fixed which is in engagement with the frame 20 into which the slot 10 is to be cut, by the set screws 40. A coil spring 41 is arranged around the rod 37 and bears against the wall of the casing 14, 15 and against a disc 42 on the rod 37. A milled nut 43 cooperates with the screw threaded rod 37 and serves to displace the frame part 20 relatively to the wall of the casing.

The curve or slot 10 is now determined by adjusting the range of pressure to be transmitted from zero to a determined maximum pressure by screwing the piston 30 into the cylinder 29 and generating thereby liquid pressure the height of which is indicated by the manometer. The pressure liquid acts upon the piston 3 of the indicator and causes a displacement of the piston and of the rod 4 in the vertical direction. Simultaneously the frame 20 is displaced by means of the device 37, 43 in the horizontal direction to such an extent that the indications of the measuring instrument 26 correspond to those of the manometer 32 during all the stages of the variation of the pressure. The rotating cutter 34 produces at the same time the slot 10 in the frame 20.

As previously stated, I may use a setting out device or scribe, by means of which the centre line of the curve is made or the contour defined, as the case may be, as a continuous shallow groove or a scratch on the member 20. The member is subsequently cut according to this demarcation.

Or I may use a milling tool having cutting edges on both its face and periphery, and define the slot by directly milling it. Or I may cut the slot at first roughly and complete it afterwards.

In cutting the slot during calibration the piston 30 is first adjusted so that the pressure in the cylinder 33 is zero and the knob 43 turned to adjust the segment so that the current meter will also indicate zero.

The cutter is caused to rotate and axially fed and drills a round hole at the zero position. The cutter is withdrawn from the member and the piston 30 is screwed in until the pressure gauge registers, say ten. Knob 43 is then turned until the current meter also reads ten, and the cutter again operated making a second hole that may or may not overlap the first hole, and in like manner as many other holes are drilled as is necessary. The cutter is then passed along the slot so roughly cut, to smooth the sides.

Or I may first cut a hole through the member at the zero position and simultaneously increase the pressure on piston 30 and slowly operate milled knob 43, and do this so that the manometer and current meter have coincident readings.

After the slot 10 has been finished and a roller 9 adapted to slide in the slot 10 is fitted to the arm 8 in lieu of the rotary cutter 34, the device together with the electrical transmission means upon being connected to the working space of a prime mover or the like will transmit the pressure effects occurring in the working space and convert same into electrical effects while compensating all the faults and deviations inherent to the transmission means.

In order to assure that the means for converting the pressure effects afford a reliable continuous working, the piston of the indicator is so designed that the surface of the piston that is in contact with the hot driving gases or steam and with oil recedes from the pressure space when the pressure and the temperature increase. The piston is of the plunger type and projects into the pressure space by an amount corresponding to the maximum extension of the indicator spring.

The resistance segment 22 is, in contradistinction to the segment disclosed in my above-mentioned U. S. Patent No. 1,355,661 which consists of a plurality of laminated elements, made of one piece of resistance material, for instance of siliciuretted carbon or the like, and is ground to a suitable radius and is inserted from above into the iron casing 14, 15 which serves to magnetically attract the contact segment 21 in such a manner that an exchange and a cleaning of the resistance segment can conveniently be effected.

In order to make the provision of separate magnet superfluous the casing 14, 15 itself is built to serve as such, and consists of two dish shaped parts 14 and 15 made of iron, to which the magnet cores 18 and 19 are fixed. The contact segment 21, which consists also of iron, is attracted by the pole pieces 14, 15 and is strongly pressed against the resistance segment 22 which is held between the pole pieces and insulated against and projects below the latter so that the rolling movement of the contact segment 21 on the resistance segment 22 occasioned by the movement of the indicator piston upon pressure variations in the working space causes in a known manner resistance to be cut in or out and to be utilized for indicating purposes.

I claim:

1. In the method of making a slot in an element of an engine power measuring mechanism having a fluid pressure sensitive device, an electrical resistance, a rolling contact device one of said devices provided with such slot, and a roller on the other of said devices entering said slot, the steps of determining said slot, which comprise replacing said roller by a driven cutting tool, placing said pressure sensitive device under measured pressures, and positively rolling said contact device to positions on said resistance to indicate electrical indications corresponding to said pressures.

2. In an engine indicating mechanism, a cylinder for attachment to and communicating with the interior of an engine cylinder, a spring loaded piston therein, a casing, a resistance mounted in the casing, an arcuate contact member in the casing arranged to roll on said resistance and having a slotted shank engaged by said roller, an aperture in the casing support, a screw mounted in the aperture, set screws on the end of the screw to seize and hold the shank of said contact member and a milled nut on the screw, said milled nut and screw operating to roll said contact on said resistance when said roller is replaced by a driven cutting tool to positively move said contact to indicate electrical units proportional to definite pressures applied to said piston.

3. The method of making a cam surface in an element of an engine power indicating mechanism having a fluid pressure sensitive means, an electrical resistance and a rolling contact device provided with such cam surface; the steps of determining the cam surface, which comprise placing the pressure sensitive means under different measured fluid pressures, positively rolling said device to different positions on said resistance to indicate electrical resistances corresponding to said pressures and defining said surface in accordance with the different corresponding positions assumed by both said means and said device.

In testimony whereof I affix my signature.

AUGUST FRISCH.